United States Patent [19]

Monigold

[11] 4,205,784
[45] Jun. 3, 1980

[54] TEMPERATURE ACTUATED MULTIPLE FUNCTION FLUID CONTROL VALVE

[75] Inventor: Larry E. Monigold, Cadillac, Mich.

[73] Assignee: Kysor Industrial Corporation, Cadillac, Mich.

[21] Appl. No.: 946,081

[22] Filed: Sep. 26, 1978

[51] Int. Cl.² .............................................. F01P 7/10
[52] U.S. Cl. .................................. 236/35.2; 137/596; 137/627.5; 137/630.22; 137/864; 236/86
[58] Field of Search .................. 236/34.5, 86, 87, 35.2, 236/100; 137/864, 630.22, 596, 596.1, 596.2, 627.5

[56] References Cited

U.S. PATENT DOCUMENTS

| 1,540,181 | 6/1925 | Olson | 137/596.1 |
| 3,006,552 | 10/1961 | Ferris | 236/86 X |
| 3,118,648 | 1/1964 | Campbell | 236/100 X |
| 3,313,485 | 4/1967 | Harvey | 236/86 |
| 3,955,760 | 5/1976 | Ridenour et al. | 236/86 |
| 4,065,052 | 12/1977 | Ridenour | 236/86 |
| 4,116,218 | 9/1978 | Acre et al. | 137/627.5 |
| 4,146,056 | 3/1979 | Buchanan | 137/630.22 |

Primary Examiner—Henry C. Yuen
Assistant Examiner—William E. Tapolcai, Jr.
Attorney, Agent, or Firm—Price, Heneveld, Huizenga and Cooper

[57] ABSTRACT

A temperature responsive fluid control valve with sequential control functions, employing a pair of axially aligned hollow elongated plungers or slide pins, and a pair of ball valves and valve seats therefor. One ball valve is straddled by the two plungers, being biased onto its seat by the second plunger and shiftable off its seat by the first plunger. This ball valve controls a first fluid flow in response to a thermoresponsive sensor acting on the first plunger. The second ball valve is operated sequentially after the first, via the second plunger for control of a second sequential fluid flow using the same thermoresponsive sensor.

4 Claims, 4 Drawing Figures

TEMPERATURE ACTUATED MULTIPLE FUNCTION FLUID CONTROL VALVE

BACKGROUND OF THE INVENTION

This invention relates to a temperature responsive fluid control valve. Temperature responsive valves are presently used to control fluid flow between a pressure or vacuum source and a fluid actuator, as for control of a vehicle radiator shutter or the like. Such a valve typically has a thermoresponsive element positioned in the engine coolant through a port in the engine. See e.g. U.S. Pat. Nos. 3,853,269 and 3,135,495. The shutter is therefore operated in response to engine temperature for control of the engine temperature. See e.g. U.S. Pat. No. 3,198,298. Some engines also employ a fan drive clutch which is operated in response to engine temperature conditions. Such a clutch is typically controlled by a second control valve with its higher temperature thermoresponsive element also in the engine coolant via a second port in the engine. The shutter regulates the amount of air allowed to flow through the radiator. The fan clutch regulates the amount of air dynamically drawn or blown, i.e. propelled through the radiator.

Optimally, these two separately functioning systems should operate cooperatively to create a large range of variable air flow conditions for engine temperature control. But, because the two operate independently, their operation can be mutually conflicting. This possibility of mutual interference can be caused for example by one or both of the units not being accurately preset or not properly located in the engine cooling system or one or both not functioning accurately for some other reason. At best they require the expense of two control valves and two ports in the engine block to the coolant systems.

SUMMARY OF THE INVENTION

The present temperature responsive fluid flow control valve regulates two fluid flow systems and hence the two functions, in positive sequential fashion, using the same temperature sensor. The control is particularly suitable for controlling an automatic radiator shutter and an air operated fan drive clutch of an engine in cooperative fashion. Only one port in the engine block is necessary. The same valve unit sequentially controls the fluid supply to both the shutter and the fluid supply to the clutch. The two functions cannot overlap and interfere with each other. Rather, their cooperative function assures a wide range of regulated air flow conditions to optimize engine operating temperature for better fuel economy and longer engine life.

DESCRIPTION OF THE PREFERRED EMBODIMENT

Figure 1:
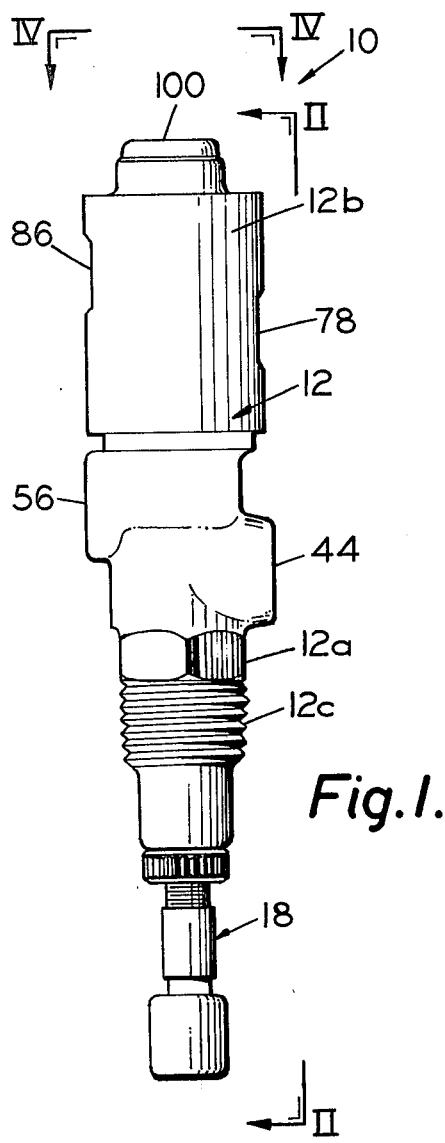
FIG. 1 is a side elevational view of the novel control valve.
Figure 2:
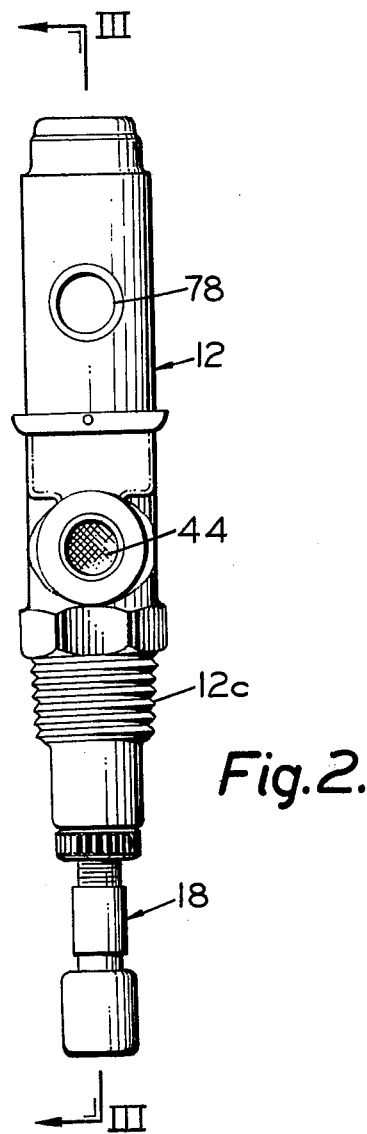
FIG. 2 is an elevational view of the valve in FIG. 1 taken on plane II—II.
Figure 4:
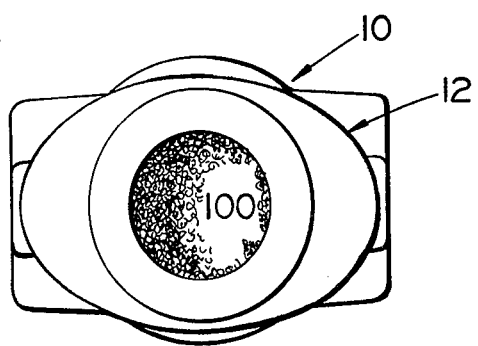
FIG. 4 is an end view of the valve taken on plane IV—IV of FIG. 1.

Referring to the embodiment of this invention depicted in the drawings, the assembly 10 includes an elongated valve housing 12 formed of a pair of interfitting components 12a and 12b interconnected by fasteners 14. Extending the length of this elongated housing is a passage 16 having passage portions 16a and 16b. Threadably connected in one end of this passage and specifically of passage portion 16a is a thermoresponsive subassembly 18 of conventional type. It includes a temperature sensing bulb 18' which extends into the coolant flow passage of an engine block shown by phantom lines 20 to which the valve is connected by threaded fasteners 12c. Sensor 18' contains a conventional substance which expands with increasing temperature to extend component 18" which projects into passage 16. The substance contracts with decreasing temperature to retract component 18". Engaging the end of movable component 18" is a first elongated plunger or push rod 22. This plunger, located in passage portion 16a, is biased into engagement with component 18" by a compression coil spring 24 around the plunger, one end of the spring abutting an annular washer 26 which in turn engages a fixed annular shoulder in the passage, and the other end abutting an annular washer 28 which in turn abuts an annular collar 30 fixed on movable plunger 22. A bleed port 27 in housing 12 communicates the area between washers 26 and 28 to the outside for free air movement therebetween during compression and extension of spring 24. This biasing spring also biases plunger 22 away from engagement with the first ball valve element 32 normally retained on a valve seat 34, the valve element and valve seat collectively forming a ball valve. The inner end of slide pin 22 or plunger, i.e. the end toward the ball valve, is hollow, having an interior passage 22a which has an axial port seat 22b on the end of the plunger toward the ball valve so as to form a valving action with the ball valve element when engaging it. The other end of the plunger passage 22a has a radial port 22c which communicates to the circumferential periphery of the plunger and an annular chamber 38. This chamber is on the inner diameter of an annular sleeve-like spacer 40 which in turn has an annular chamber 42 around its outer periphery. Port 40a connects these chambers. Chamber 42 communicates through port 44 in valve housing 12, connectable by threads to an air or vacuum source 46 (shown schematically). Preferably a screen 48 is in port 44. Spacer 40 has a pair of annular seal rings 50 and 52 at its axial ends. Thus, spring 24, slide pin 22, and spacer 40 are all in passage portion 16a.

Also communicating with passage portion 16a is an outlet port 56 which is connectable to and communicant with a shutter actuator 58 (shown schematically) such as a fluid cylinder. Preferably the radiator shutter, e.g. of the type set forth in U.S. Pat. No. 3,198,298 is spring biased to the open position and fluid actuated to the closed position, the fluid actuator being an air cylinder or the like. When plunger 22 is in the position depicted in FIG. 3, the fluid from source 46 through port 44 is communicant with outlet port 56 to retain the shutter in a closed condition to inhibit cooling air flow through the radiator or the portion thereof that the shutter covers.

On the opposite side of ball valve element 32 from plunger 22 is one or more exhaust ports 60 such that, when ball valve element 32 is off its seat 34, port 56 will be communicant with these exhaust ports 60 to allow compressed air or the like to escape from shutter actuator 58 and thereby enable its spring bias control to open the shutter assembly for air flow through the raditor.

Valve element 32 is normally biased against its valve seat 34 by a compression spring 64 retained as between a pair of cups 66 and 68. The spring is around a second plunger or slide pin 70, with cup 66 engaging a shoulder of the valve housing portion 12b and cup 68 being retained by an annular collar 71 around plunger 70. The inner end of plunger 70 is retained in engagement with ball 32, this end having a concave configuration to match the ball. Movement of ball 32 off its seat therefor must be against the force of biasing spring 64 by axial movement of plunger 70. These two plungers 70 and 22 straddle the ball valve, with plunger 70 constantly engaging and normally retaining the ball on its seat, and plunger 22 capable of shifting the ball off its seat.

Plunger 70 is located in the second portion 16b of passage 16. The end of plunger 70 opposite ball 32 is hollow, having passage 70a open to one axial end where a port seat 70b is located and having a second port 70c at its other end. Port 70c communicates with an annular chamber 72 around the plunger and within an annular collar-shaped spacer 74. Spacer 74 has a radial port 74a that communicates from inner chamber 72 to an outer chamber 76 around the outer periphery of spacer 74. Communicant with chamber 76 is a port 78 in housing portion 12b which is connectable to compressed air or vacuum source 80 with threaded fasteners or the like. At opposite ends of spacer 74 is a pair of annular seal rings such as O-rings 82 and 84. Air or vacuum at source 80 is able to communicate through this series of ports and passages to an outlet port 86 in housing portion 12b communicant with a fan clutch 88 preferably spring biased to the fan drive condition and shifted to the non-drive condition by fluid through this control valve.

Adjacent axial end port 70b in plunger 70 is a second ball valve including a ball valve element 90 and its valve seat 92 against which the ball valve element is normally retained by a compression coil spring 94. This spring is retained between a fixed retainer 96 held by the housing, and a cup 98 that engages ball 90. Ball 90 has passage portion 16b on the inner face thereof, and exhaust ports 100 preferably including a filter 102 on the outer face of the ball.

This control valve serves in a special manner when the engine coolant is increasing in temperature to sequentially activate the shutter system for increasing air flow through the radiator and, then sequentially, as necessary, activate the fan clutch for increasing the air propelled through the radiator by the fan system. The combination thereby enables a wide range of air flow conditions to be achieved for optimum control of the engine temperature. When the engine coolant temperature is decreasing, the control valve first deactivates the fan drive and then, as necessary, closes the shutter system to prevent the engine temperature from being lowered too far.

To assure clarity of operation of this novel mechanism, the following detailed operation description is set forth.

Figure 3:
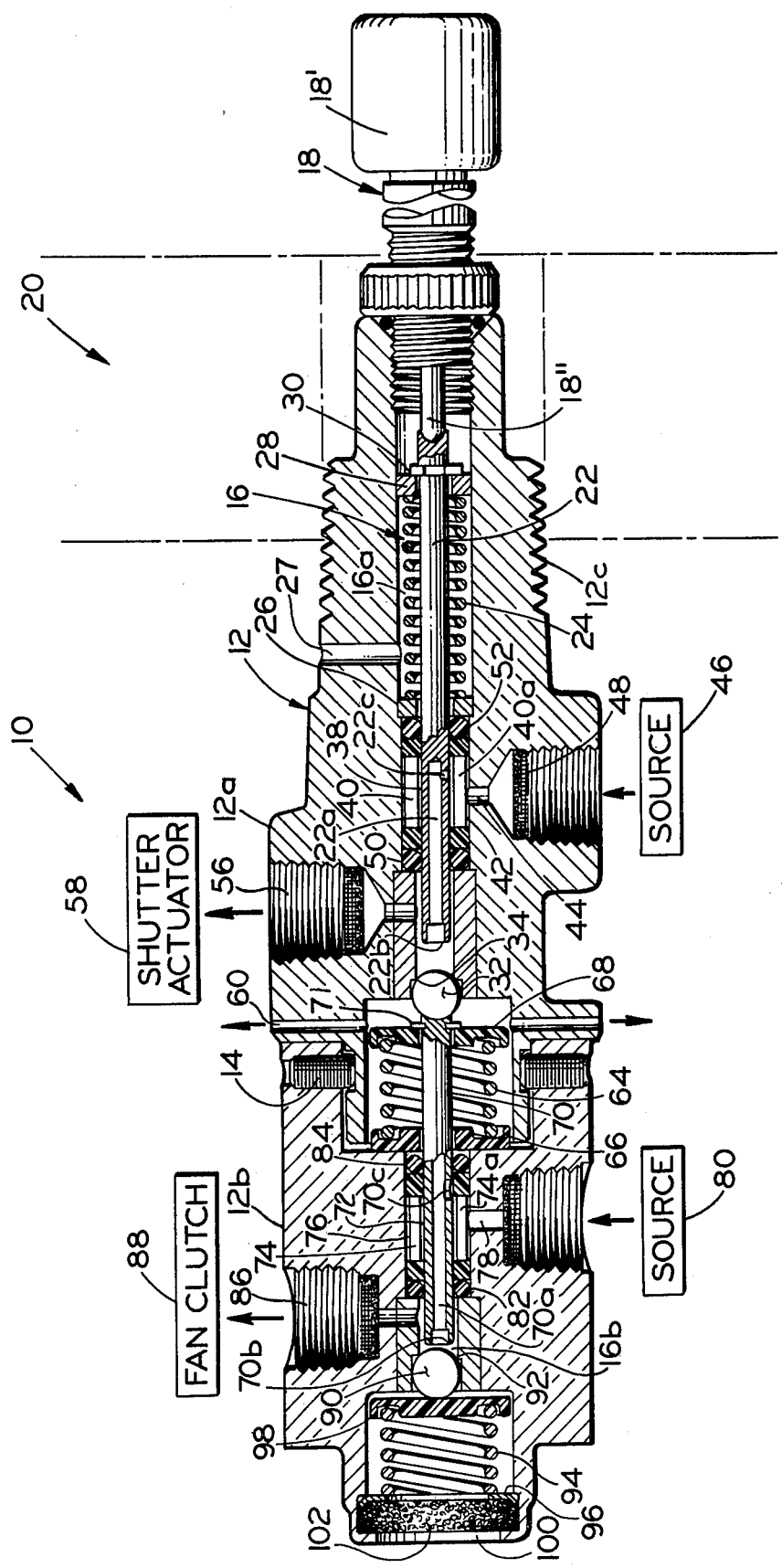
FIG. 3 is a sectional view of the valve taken on plane III—III of FIG. 2.

When in the position depicted in FIG. 3, pressurized air from source 46 communicates through port 44 of the housing, chamber 42, port 40a, chamber 38, port 22c, passage 22a, port 22b, and discharge port 56 to maintain shutter actuator 58 shifted against its spring bias to hold the shutter in its closed position, thereby minimizing air flow through the radiator of the vehicle. Also, the pressurized air in source 80 is communicant with port 78, chamber 76, port 74a, chamber 72, port 70c, passage 70a, port 70b and hence with discharge port 86 to the fan clutch 88 to retain the fan in its non-driving condition. Thus, the engine is allowed to increase in temperature with minimum air coolant flow. As the engine coolant temperature thus increases, the contents of thermoexpansion element 18 expands, thereby extending component 18" to shift plunger 22 gradually against the bias of coil sring 24.

With sufficient temperature increase to shift the plunger 22 into engagement with ball valve element 32, the communication from source 46 to shutter actuator 58 is closed off. Further movement of plunger 22 shifts ball 32 off its valve seat 34 to allow any pressurized air at shutter actuator 58 to flow out exhaust ports 60. But the continued closure of port 22b prevents exhausting of source 46 to exhaust port 60. This allows the biasing mechanism of the shutter system to open the shutters for flow of cooling air through the radiator. The amount that ball 32 is shifted from its seat will determine the rapidity and exhaust of the air from the shutter actuator and therefore opening of the shutter system. If the engine coolant temperature continues to rise, thermoresponsive element 18 will further shift plunger 22, which will shift valve 32 further, which in turn shifts second plunger 70 against its biasing spring 64 so that ultimately port 70b of plunger 70 will be closed by the ball 90 when plunger 70 engages this ball valve element. Such engagement will stop communication between pressurized air source 80 and fan clutch 88. Further shifting of the two slide pins and the straddled ball 32 will shift ball valve element 90 off its seat 92 to allow pressurized air at fan clutch 88 to flow back through port 86, passage 16b and escape out exhaust port 100. But continued closure of port 70b by ball 90 prevents exhausting of source 80 out port 100. Thus, the spring bias of the fan clutch will drive the fan to propel a greater amount of air through the radiator. If, as a result, the temperature of the engine coolant lowers, this entire mechanism will operate sequentially in reverse, with ball valve element 90 first engaging its seat, plunger 70 retracting away from the ball valve to again cause communication between source 80 and fan clutch 88, ball 32 then engaging its seat, and slide pin 22 retracting from ball 32 to reestablish the communication between source 46 and shutter actuator 58. This sequential action in one direction or another is constantly controlled for maximum cooperative effort without interference between these functions.

Conceivably sources 46 and 80 could be vacuum sources with any actual air flow occurring in the opposite direction from that which would exist if such are pressurized air sources, as would be evident to persons skilled in this field.

It is also conceivable that the control valve could be employed in other environments than for controlling engine temperatures (i.e. fan drive/air whistle alarm; shutter/fan drive override for automatic transmission, etc.).

The embodiments of the invention in which an exclusive property or privilege is claimed are defined as follows.

1. A temperature responsive sequentially functioning fluid flow control valve comprising a valve body having an elongated passage therein, connecting means for connecting a thermoexpansion element at one end of said passage; a first set of (a) inlet port, (b) outlet port and (c) exhaust port to one portion of said passage, and a second set of (a) inlet port, (b) outlet port, and (c) exhaust port to a second portion of said passage; a pair of first and second ball valves, and a pair of first and second plungers, said first ball valve and first plunger being in said one passage portion and said second ball valve and second plunger being in said second passage portion, all aligned, said first ball valve including a first ball and a first valve seat and said second ball valve including a second ball and a second valve seat; said first ball being straddled by said first and second plungers; said first plunger having a hollow inner end toward said first ball communicant with said first inlet and outlet ports, closeable by engagement with said first ball and having an outer end positioned to be shifted by the thermoexpansion element; said second plunger having one end at said first ball to be shifted thereby and having a hollow outer end toward said second ball communicant with said second inlet and outlet ports, and closeable by engagement with said second ball whereby expansive movement of said thermoexpansion element shifts said first plunger to engage and shift said first ball off its seat to control fluid communication between said first inlet and outlet ports, then sequentially shifts said second plunger via said first ball, into engagement with said second ball to control fluid communication between said second inlet and outlet ports.

2. The control valve in claim 1 wherein said first exhaust port is on the opposite side of said first ball from said first plunger to cause communication between said first outlet port and said first exhaust port when said first ball is off its seat; and said second exhaust port is on the opposite side of said second ball from said second plunger to cause communication between said second outlet port and said second exhaust port when said second ball is off its seat.

3. A temperature responsive sequential function, fluid control valve comprising: a valve housing with a passage having a first passage portion and a second passage portion; a thermally responsive actuator; a first plunger and a first ball valve in said first passage portion and a second plunger and second ball valve in said second passage portion; said first ball valve including a first ball and a first seat; said second ball valve including a second ball and a second seat; said first plunger being between said first ball and said thermally responsive actuator and biased toward said actuator and away from said first ball; said second plunger being between said first ball and said second ball and biased toward said first ball and away from said second ball to normally retain said first ball on said first seat; means for biasing said second ball onto said second seat; and said plungers and balls being aligned with each other and said actuator whereby shifting of said actuator will sequentially result in said first plunger being shifted into engagement with said first ball, said first ball being shifted by said first plunger off said first seat, said first ball shifts said second plunger into engagement with said second ball, and said second plunger shifts said second ball off said second seat; and said valve housing including a first fluid supply port and a first fluid outlet port communicable through said first plunger and closed off by engagement of said first plunger with said first ball; and a second fluid supply port and a second fluid outlet port communicable through said second plunger and closed off by engagement of said second plunger with said second ball.

4. The control valve in claim 3 wherein said valve housing includes a first exhaust port communicable with said first outlet port when said first ball is off said first seat; and a second exhaust port communicable with said second outlet port when said second ball is off said second seat.

* * * * *